(12) United States Patent
Kim

(10) Patent No.: US 12,242,040 B2
(45) Date of Patent: Mar. 4, 2025

(54) OPTICAL IMAGING SYSTEM

(71) Applicant: Samsung Electro-Mechanics Co., Ltd., Suwon-si (KR)

(72) Inventor: Hag Chul Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/413,217

(22) Filed: Jan. 16, 2024

(65) Prior Publication Data

US 2024/0151945 A1 May 9, 2024

Related U.S. Application Data

(63) Continuation of application No. 17/866,469, filed on Jul. 15, 2022, now Pat. No. 11,906,708, which is a continuation of application No. 16/807,576, filed on Mar. 3, 2020, now Pat. No. 11,391,924, which is a continuation of application No. 15/095,818, filed on Apr. 11, 2016, now Pat. No. 10,627,601.

(30) Foreign Application Priority Data

Nov. 26, 2015 (KR) .................. 10-2015-0166087

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01); *G02B 13/008* (2013.01)

(58) Field of Classification Search
CPC .............. G02B 15/146; G02B 27/0172; G02B 27/0012; G02B 27/0025; G02B 9/60; G02B 9/62; G02B 9/64; G02B 13/18; G02B 13/008; G02B 13/16; G02B 13/0045; H04N 5/2254; H04N 5/222
USPC ......... 359/656–658, 708, 713, 749, 756–762
See application file for complete search history.

(56) References Cited

U.S. PATENT DOCUMENTS

| | | |
|---|---|---|
| 10,175,459 B2 | 1/2019 | Kim |
| 10,627,601 B2 | 4/2020 | Kim |
| 10,732,384 B2 | 8/2020 | Kim |

(Continued)

FOREIGN PATENT DOCUMENTS

| | | |
|---|---|---|
| CN | 101093275 A | 12/2007 |
| CN | 202119965 U | 1/2012 |

(Continued)

OTHER PUBLICATIONS

Merged translation CN101876743 (Year: 2024).*

(Continued)

*Primary Examiner* — Travis S Fissel
(74) *Attorney, Agent, or Firm* — NSIP Law

(57) ABSTRACT

An optical imaging system includes a first lens having a positive refractive power and a concave object-side surface, a second lens having a positive refractive power, a third lens having a negative refractive power, a fourth lens having a positive refractive power, and a fifth lens having a positive refractive power and a concave image-side surface. The first through fifth lenses are sequentially disposed in ascending numerical order from an object side of the optical imaging system toward an imaging plane of the optical imaging system.

12 Claims, 6 Drawing Sheets

(56) References Cited

U.S. PATENT DOCUMENTS

| | | |
|---|---|---|
| 11,194,134 B2 | 12/2021 | Kim |
| 2001/0022698 A1 | 9/2001 | Sato |
| 2004/0240080 A1 | 12/2004 | Matsui et al. |
| 2013/0016278 A1 | 1/2013 | Matsusaka et al. |
| 2013/0100546 A1 | 4/2013 | Okano |
| 2013/0182339 A1 | 7/2013 | Sekine et al. |
| 2014/0293447 A1* | 10/2014 | Noda .................. G02B 9/60 359/714 |
| 2015/0022714 A1 | 1/2015 | Huang |
| 2015/0168688 A1* | 6/2015 | Kondo ............... G02B 13/0045 359/714 |
| 2015/0185440 A1 | 7/2015 | Chen |
| 2016/0004042 A1 | 1/2016 | Kubota et al. |
| 2016/0131871 A1 | 5/2016 | Tang et al. |

FOREIGN PATENT DOCUMENTS

| | | | |
|---|---|---|---|
| CN | 101876743 B | * | 2/2012 |
| CN | 104330874 A | | 2/2015 |
| EP | 1 628 151 A1 | | 2/2006 |
| GB | 2 201 257 A | | 8/1988 |
| JP | 2000-98226 A | | 4/2000 |
| JP | 2006-293042 A | | 10/2006 |
| JP | 2011-154318 A | | 8/2011 |
| KR | 10-2014-0084569 A | | 7/2014 |
| KR | 10-2015-0044681 A | | 4/2015 |
| RU | 2 154 292 C2 | | 8/2000 |
| WO | WO 2004/107009 A1 | | 12/2004 |
| WO | WO-2010024198 A1 * | 3/2010 | ......... G02B 13/0045 |

OTHER PUBLICATIONS

Merged translation WO2010024198 (Year: 2024).*
Korean Office Action issued on May 15, 2017, in counterpart Korean Application No. 10-2015-0166087 (10 pages in English, 7 pages in Korean).
Chinese Office Action issued on Aug. 3, 2018, in counterpart Chinese Patent Application No. 201610292505.9 (7 pages in English, 5 pages in Chinese).
U.S. Appl. No. 17/866,469, filed Jul. 15, 2022, Hag Chul Kim, Samsung Electro-Mechanics Co., Ltd.

* cited by examiner

| FIRST EMBODIMENT | | | | | |
|---|---|---|---|---|---|
| F number = | 1.67 | 2θ = | 55.50 | f = | 6.1000 |

| SURFACE NO. | | RADIUS OF CURVATURE | THICKNESS /DISTANCE | REFRACTIVE INDEX | ABBE NUMBER |
|---|---|---|---|---|---|
| S1 | FIRST LENS | −91.3350 | 1.4040 | 1.903 | 31.3 |
| S2 |  | −13.7080 | 0.1000 | | |
| S3 | SECOND LENS | 3.8140 | 0.8500 | 1.910 | 35.3 |
| S4 |  | 4.7700 | 0.3500 | | |
| S5 | STOP | infinity | 0.7760 | | |
| S6 | THIRD LENS | −4.1010 | 0.4500 | 1.922 | 20.9 |
| S7 |  | 12.7560 | 0.2210 | | |
| S8 | FOURTH LENS | −44.7420 | 1.6380 | 1.834 | 42.7 |
| S9 |  | −3.6000 | 0.1000 | | |
| S10 | FIFTH LENS | 5.9790 | 1.4000 | 1.834 | 42.7 |
| S11 |  | 11.9140 | 0.4500 | | |
| S12 |  | infinity | 3.6364 | | |
| S13 | IMAGING PLANE | infinity | 0.0000 | | |

FIG. 3

| SURFACE NO. | K | A | B | C | D |
|---|---|---|---|---|---|
| S6 | 0 | 0.00502762 | −0.00418738 | 0.00190203 | −0.00039505 |
| S7 | 0 | 0.00662955 | −0.00366373 | 0.00114991 | −0.00016165 |

FIG. 4

| SECOND EMBODIMENT ||||||
| --- | --- | --- | --- | --- | --- |
| F number = | 1.67 | 2θ = | 55.50 | f = | 6.1000 |
| SURFACE NO. | | RADIUS OF CURVATURE | THICKNESS /DISTANCE | REFRACTIVE INDEX | ABBE NUMBER |
| S1 | FIRST LENS | −60.0490 | 1.4040 | 1.755 | 52.3 |
| S2 | | −12.7140 | 0.1000 | | |
| S3 | SECOND LENS | 3.8070 | 0.8500 | 1.903 | 31.3 |
| S4 | | 4.7560 | 0.3500 | | |
| S5 | STOP | infinity | 0.7456 | | |
| S6 | THIRD LENS | −5.1220 | 0.3500 | 1.922 | 20.9 |
| S7 | | 8.0960 | 0.2434 | | |
| S8 | FOURTH LENS | −29.4600 | 1.6500 | 1.834 | 42.7 |
| S9 | | −3.6000 | 0.1000 | | |
| S10 | FIFTH LENS | 6.4260 | 1.4000 | 1.834 | 42.7 |
| S11 | | 16.1370 | 0.4490 | | |
| S12 | | infinity | 3.7290 | | |
| S13 | IMAGING PLANE | infinity | 0.0000 | | |

FIG. 7

| SURFACE NO. | K | A | B | C | D |
| --- | --- | --- | --- | --- | --- |
| S6 | 0 | −0.01404420 | 0.00516157 | −0.00103501 | 0 |
| S7 | 0 | −0.01021950 | 0.00354660 | −0.00573536 | 0 |

FIG. 8

OPTICAL IMAGING SYSTEM

CROSS-REFERENCE TO RELATED APPLICATIONS

This application is a continuation of application Ser. No. 17/866,469 filed on Jul. 15, 2022, now U.S. Pat. No. 11,906,708 issued on Feb. 20, 2024, which is a continuation of application Ser. No. 16/807,576 filed on Mar. 3, 2020, now U.S. Pat. No. 11,391,924 issued on Jul. 19, 2022, which is a continuation of application Ser. No. 15/095,818 filed on Apr. 11, 2016, now U.S. Pat. No. 10,627,601 issued on Apr. 21, 2020, and claims the benefit under 35 USC 119 (a) of Korean Patent Application No. 10-2015-0166087 filed on Nov. 26, 2015, in the Korean Intellectual Property Office, the entire disclosures of which are incorporated herein by reference for all purposes.

BACKGROUND

1. Field

The following description relates to an optical imaging system capable of photographing an object in both of a visible ray region and a near infrared ray region.

2. Description of Related Art

Small monitoring cameras are increasingly mounted in vehicles to photograph a front visual field and a rear visual field of the vehicle. For example, the small monitoring camera is mounted on a rearview mirror of the vehicle to photograph moving vehicles, pedestrians, and other objects, in around the vehicle.

There is a desire for a small monitoring camera capable of photographing objects in a night environment as well as in a daytime environment. However, since illumination is low in the night environment, it is difficult to clearly photograph an object. Particularly, since the small monitoring camera mounted in the vehicle has a limited size, there is a desire for a compact optical imaging system capable of photographing an object in both visible light and near infrared light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens comprising a positive refractive power, and a concave object-side surface, a second lens comprising a positive refractive power, a third lens comprising a negative refractive power, a fourth lens comprising a positive refractive power, and a fifth lens comprising a positive refractive power, a concave image-side surface. The first through fifth lenses are sequentially disposed from an object side toward an imaging plane.

An object-side surface of the second lens may be convex, and an image-side surface of the second lens may be concave. An object-side surface of the fourth lens may be concave, and an image-side surface of the fourth lens may be convex. An object-side surface of the fifth lens may be convex.

The optical imaging system may further include a stop disposed between the second lens and the third lens.

Both surfaces of the third lens may be aspherical.

The optical imaging system may satisfy the conditional expression $-6.5<\{(1/f)*(Y/\tan\theta)-1\}*100<-1.0$ in which f may be an overall focal length of the optical imaging system, Y may be ½ of a diagonal length of the imaging plane, and $\theta$ may be ½ of a field of view of the optical imaging system.

The optical imaging system may satisfy the conditional expression $TTL/2Y<2.0$ in which TTL may be a distance from the object-side surface of the first lens to the imaging plane, and 2Y may be a diagonal length of the imaging plane.

The optical imaging system may satisfy the conditional expression $-20.0<R1/f<0$ in which f may be an overall focal length of the optical imaging system, and R1 may be a radius of curvature of the object-side surface of the first lens.

The optical imaging system may satisfy the conditional expression $-15.0<R2/f<0$ in which f may be an overall focal length of the optical imaging system, and R2 may be a radius of curvature of an image-side surface of the first lens.

The optical imaging system may satisfy the conditional expression $0.2<f/f1<0.6$ in which f may be an overall focal length of the optical imaging system, and f1 may be a focal length of the first lens.

The optical imaging system may satisfy the conditional expression $-2.5<f/f3<-1.5$ in which f may be an overall focal length of the optical imaging system, and f3 may be a focal length of the third lens.

The optical imaging system may satisfy the conditional expression $5.0<(t1+t2)/t3<12.0$ in which t1 may be a thickness of an optical axis center of the first lens, t2 may be a thickness of an optical axis center of the second lens, and t3 may be a thickness of an optical axis center of the third lens.

The optical imaging system may satisfy the conditional expression $0 \leq |n1-n2| \leq 0.20$ in which n1 may be a refractive index of the first lens, and n2 may be a refractive index of the second lens.

In another general aspect, an optical imaging system includes a first lens having a positive refractive power, a second lens having a positive refractive power, a third lens having concave surfaces, a fourth lens having a positive refractive power, and a fifth lens having a positive refractive power. The first lens and the fifth lens are symmetrical to each other in relation to the third lens, and the second lens and the fourth lens are symmetrical to each other in relation to the third lens.

The surfaces of the third lens may be aspherical.

An overall focal length of the optical imaging system may be between 5.9 to 6.3 mm, and a focal length of the third lens may be between −4.0 to −2.0 mm. The optical imaging system may also satisfy the conditional expression $-6.5<\{(1/f)*(Y/\tan\theta)-1\}*100<-1.0$ in which f may be an overall focal length of the optical imaging system, Y may be ½ of a diagonal length of the imaging plane, and $\theta$ may be ½ of a field of view of the optical imaging system.

Other features and aspects will be apparent from the following detailed description, the drawings, and the claims.

BRIEF DESCRIPTION OF DRAWINGS

FIG. 3 is a table representing characteristics of lenses of the optical imaging system illustrated in FIG. 1.

FIG. 4 is a table representing aspherical characteristics of the optical imaging system illustrated in FIG. 1.

FIG. 7 is a table representing characteristics of lenses of the optical imaging system illustrated in FIG. 5.

FIG. 8 is a table representing aspherical characteristics of the optical imaging system illustrated in FIG. 5.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
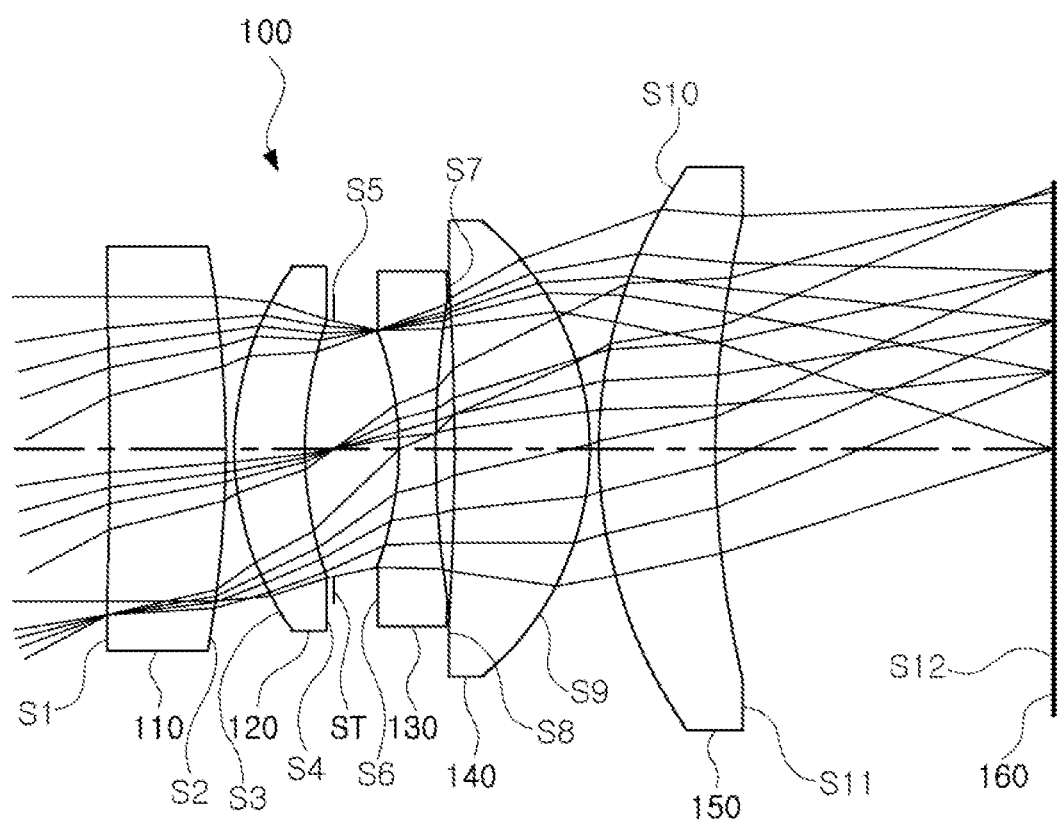
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the description. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, in the following description, a first lens refers to a lens closest to an object (or a subject), while a fifth lens refers to a lens closest to an imaging plane (or an image sensor). In addition, all radii of curvatures and thicknesses of lenses, a TTL, a Y (½ of a diagonal length of the imaging plane), and focal lengths are represented by millimeters (mm). Furthermore, thicknesses of the lenses, gaps between the lenses, and the TTL are distances measured in relation to optical axes of the lenses. Furthermore, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex. TTL refers to a distance from a first object side surface of a first lens to an imaging plane along an optical axis.

An optical imaging system may include an optical system including a plurality of lenses. For example, the optical system of the optical imaging system may include five lenses having refractive power. However, the optical imaging system is not limited to including only the lenses having the refractive power. For example, the optical imaging system may include a stop for controlling an amount of light. Furthermore, the optical imaging system may further include an image sensor (that is, an imaging device) converting an image of a subject incident thereto through the optical system into electrical signals. Furthermore, the optical imaging system may further include a gap maintaining member adjusting a gap between lenses.

First through fifth lenses may be formed of materials having a refractive index different from that of air. For example, the first through fifth lenses may be formed of plastic or glass. At least one of the first through fifth lenses may have an aspherical shape. For example, both surfaces of the third lens may be aspherical.

An aspherical surface of each of the lenses may be represented by the following Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}. \tag{1}$$

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

An optical imaging system may include five lenses, an image sensor, and a stop. Next, the above-mentioned components will be described.

The first lens may have refractive power. For example, the first lens may have positive refractive power. One surface of the first lens may be concave. For example, an object-side surface of the first lens may be concave.

The first lens may have a spherical surface. For example, both surfaces of the first lens may be spherical. The first lens may be formed of a material having high light transmissivity and excellent workability. For example, the first lens may be formed of glass. However, a material of the first lens is not limited to glass. For example, the first lens may be formed of plastic. The first lens may have a predetermined refractive index. For example, a refractive index of the first lens may be 1.70 or more.

The second lens may have refractive power. For example, the second lens may have positive refractive power. One surface of the second lens may be concave. For example, an image-side surface of the second lens may be concave.

The second lens may have a spherical surface. For example, both surfaces of the second lens may be spherical. The second lens may be formed of a material having high light transmissivity and excellent workability. For example, the second lens may be formed of glass. However, a material of the second lens is not limited to glass. For example, the second lens may also be formed of plastic. The second lens may have a refractive index higher than that of the first lens. For example, a refractive index of the second lens may be 1.90 or more.

The third lens may have refractive power. For example, the third lens may have negative refractive power. At least one surface of the third lens may be concave. For example, both surfaces of the third lens may be concave.

The third lens may have an aspherical surface. For example, both surfaces of the third lens may be aspherical. The third lens may be formed of a material having high light transmissivity and excellent workability. For example, the third lens may be formed of glass. However, a material of the third lens is not limited to glass. For example, the third lens may be formed of plastic.

The third lens may have a refractive index higher than that of the first lens. For example, a refractive index of the third lens may be 1.90 or more. The third lens may have an Abbe number lower than that of the first lens. For example, an Abbe number of the third lens may be 25 or less.

The fourth lens may have refractive power. For example, the fourth lens may have positive refractive power. One surface of the fourth lens may be concave. For example, an object-side surface of the fourth lens may be concave.

The fourth lens may have a spherical surface. For example, both surfaces of the fourth lens may be spherical. The fourth lens may be formed of a material having high light transmissivity and excellent workability. For example, the fourth lens may be formed of glass. However, a material of the fourth lens is not limited to glass. For example, the fourth lens may be formed of plastic.

The fourth lens may have a refractive index lower than that of the third lens. For example, a refractive index of the fourth lens may be less than 1.90. The fourth lens may have an Abbe number higher than that of the third lens. For example, an Abbe number of the fourth lens may be 40 or more.

The fifth lens may have refractive power. For example, the fifth lens may have positive refractive power. At least one surface of the fifth lens may be concave. For example, an image-side surface of the fifth lens may be concave.

The fifth lens may have a spherical surface. For example, both surfaces of the fifth lens may be spherical. The fifth lens may be formed of a material having high light transmissivity and excellent workability. For example, the fifth lens may be formed of glass. However, a material of the fifth lens is not limited to glass. For example, the fifth lens may be formed of plastic.

The fifth lens may have a refractive index lower than that of the third lens. For example, a refractive index of the fifth lens may be less than 1.90. The fifth lens may have an Abbe number higher than that of the third lens. For example, an Abbe number of the fifth lens may be 40 or more.

The image sensor may be configured to realize high resolution. For example, a unit size of pixels configuring the image sensor may be 1.12 μm or less. An imaging plane on which an image is formed may be formed on a surface of the image sensor.

The stop may be disposed between lenses. For example, the stop may be disposed between the second and third lenses. The stop disposed as described above may adjust an amount of light incident to the image sensor.

The optical imaging system may satisfy the following Conditional Expressions:

$6.5 < \{(1/f)*(Y/\tan \theta) - 1\}*100 < -1.0$     Conditional Expression 1

$TTL/2Y < 2.0$     Conditional Expression 2

$-20.0 < R1/f < 0$     Conditional Expression 3

$-15.0 < R2/f < 0$     Conditional Expression 4

$0.2 < f/f1 < 0.6$     Conditional Expression 5

$-2.5 < f/f3 < -1.5$     Conditional Expression 6

$1.5 < f/EPD < 1.7$     Conditional Expression 7

$5.0 < (t1+t2)/t3 < 12.0$     Conditional Expression 8

$0 \leq |n1-n2| \leq 0.2$     Conditional Expression 9

$-0.5 < (R1+R2)/(R1-R2) < 5.5$     Conditional Expression 10

$-5.5 < (R10+R11)/(R10-R11) < 0.5.$     Conditional Expression 11

Here, f is an overall focal length of the optical imaging system, 2Y is a diagonal length of the imaging plane, Y is ½ of 2Y, θ is ½ of a field of view of the optical imaging system, R1 is a radius of curvature of the object-side surface of the first lens, R2 is a radius of curvature of an image-side surface of the first lens, R10 is a radius of curvature of an object-side surface of the fifth lens, R11 is a radius of curvature of the image-side surface of the fifth lens, f1 is a focal length of the first lens, f3 is a focal length of the third lens, EPD is an entrance pupil diameter (EPD), t1 is a thickness of an optical axis center of the first lens, t2 is a thickness of an optical axis center of the second lens, t3 is a thickness of an optical axis center of the third lens, n1 is a refractive index of the first lens, and n2 is a refractive index of the second lens.

The optical imaging system satisfying the above Conditional Expressions may be miniaturized, and may realize high resolution. In addition, the above Conditional Expressions may be necessary and sufficient conditions for realizing a bright optical imaging system.

Referring to FIG. 1, an optical imaging system 100 according to a first embodiment includes a plurality of lenses having refractive power. For example, the optical imaging system 100 includes a first lens 110, a second lens 120, a third lens 130, a fourth lens 140, and a fifth lens 150.

The first lens 110 has a positive refractive power, and an object-side surface S1 thereof is concave and an image-side surface S2 thereof is convex. The second lens 120 has a positive refractive power, and an object-side surface S3 thereof is convex and an image-side surface S4 thereof is concave. The third lens 130 has a negative refractive power, and both surfaces S6 and S7 thereof are concave. The fourth lens 140 has a positive refractive power, and an object-side surface S8 thereof is concave and an image-side surface S9 thereof is convex. The fifth lens 150 has a positive refractive power, and an object-side surface S10 thereof is convex and an image-side surface S11 thereof is concave.

A stop ST having a surface S5 is disposed between the second lens and the third lens. For example, the stop ST is disposed between the image-side surface S4 of the second lens 120 and an object-side surface S6 of the third lens 130. However, the location of the stop ST is not limited to between the second lens 120 and the third lens 130 and the location of the stop ST may be varied as desired. The stop ST disposed as described above adjusts an amount of light incident on an imaging plane 160.

The first lens 110 and the fifth lens 150 are symmetrical to each other in relation to the third lens. For example, both of the object-side surface S1 of the first lens 110 and the image-side surface S11 of the fifth lens 150 are concave, and both of the image-side surface S2 of the first lens 110 and the object-side surface S10 of the fifth lens 150 are convex.

Similarly, the second lens 120 and the fourth lens 140 are symmetrical to each other in relation to the third lens. For example, both of the object-side surface S3 of the second lens 120 and the image-side surface S9 of the fourth lens 140 are convex, and both of the image-side surface S4 of the second lens 120 and the object-side surface S8 of the fourth lens 140 are concave.

Figure 2:
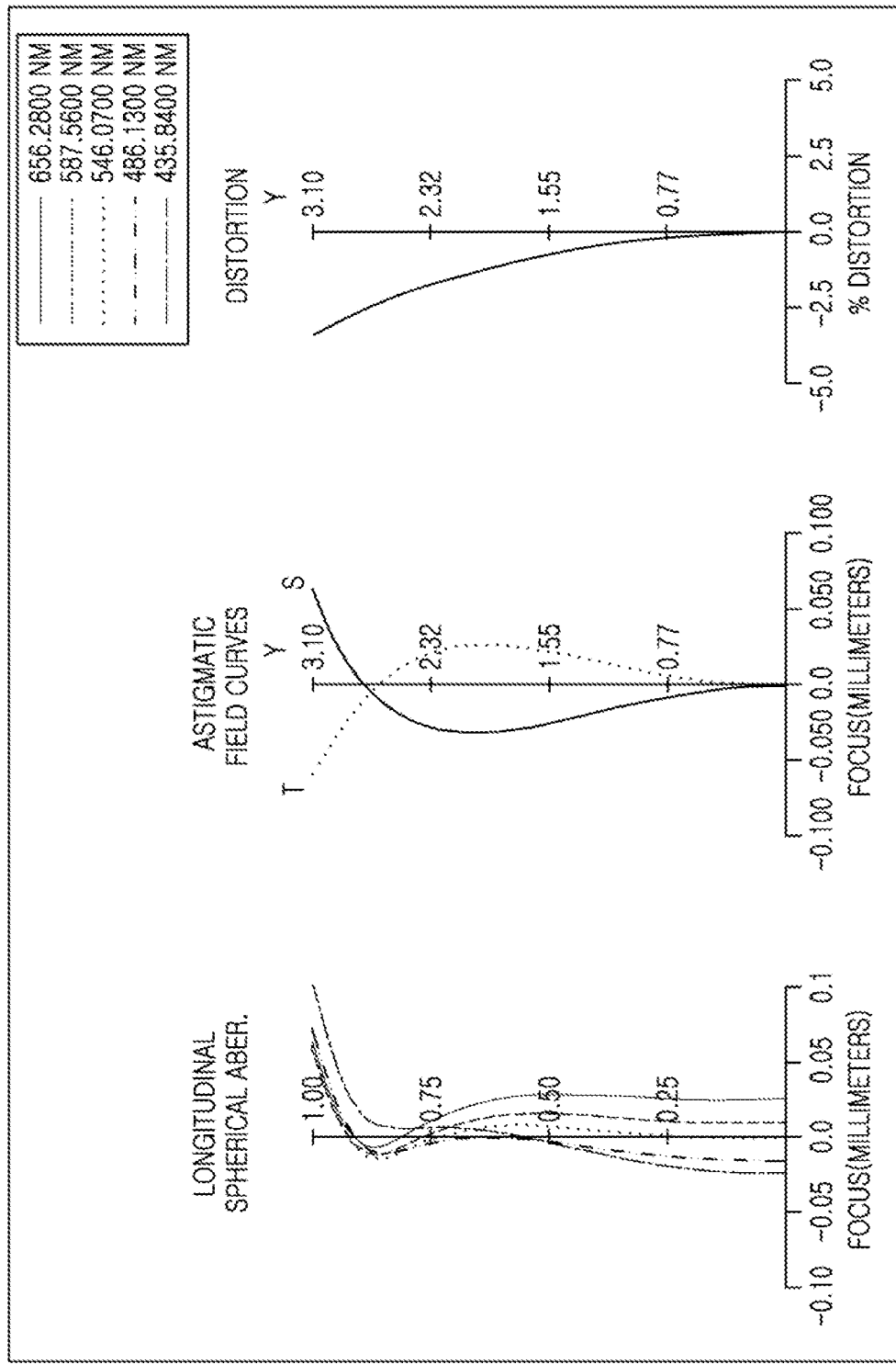
FIG. 2 is graphs representing aberration curves of the optical imaging system illustrated in FIG. 1.

The optical imaging system 100 configured as described above has aberration characteristics as illustrated in FIG. 2. FIG. 3 is a table representing characteristics of lenses of the optical imaging system according to the first embodiment; and FIG. 4 is a table representing aspherical characteristics of the optical imaging system according to the first embodiment.

Figure 5:
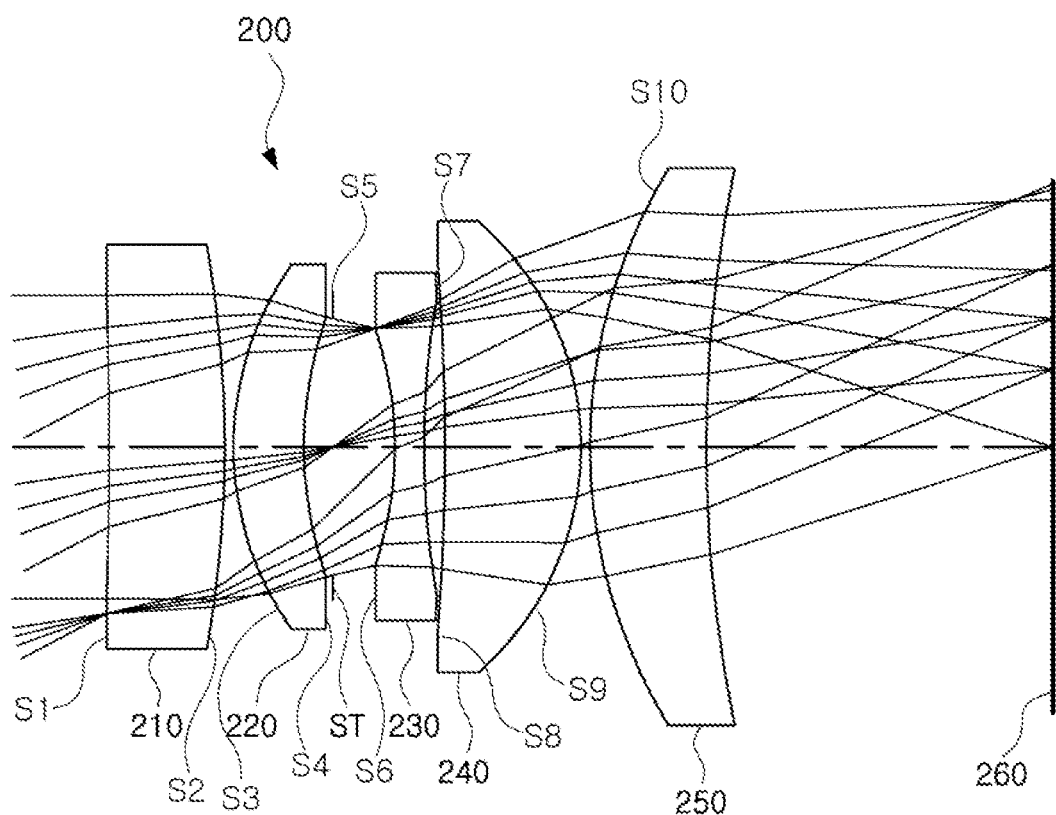
FIG. 5 is a view of an optical imaging system according to a second embodiment.

Referring to FIG. 5, an optical imaging system 200 according to a second embodiment includes a plurality of lenses having refractive power. For example, the optical imaging system 200 includes a first lens 210, a second lens 220, a third lens 230, a fourth lens 240, and a fifth lens 250.

The first lens 210 has a positive refractive power, and an object-side surface S1 thereof is concave and an image-side surface S2 thereof is convex. The second lens 220 has a positive refractive power, and an object-side surface S3 thereof is convex and an image-side surface S4 thereof is concave. The third lens 230 has a negative refractive power, and both surfaces S6 and S7 thereof are concave. The fourth lens 240 has a positive refractive power, and an object-side surface S8 thereof is concave and an image-side surface S9 thereof is convex. The fifth lens 250 has a positive refractive power, and an object-side surface S10 thereof is convex and an image-side surface S11 thereof is concave.

A stop ST having a surface S5 is disposed between the second lens and the third lens. For example, the stop ST is disposed between the image-side surface S4 of the second lens 220 and an object-side surface S6 of the third lens 130. However, the location of the stop ST is not limited to between the second lens 220 and the third lens 230 and the location of the stop ST may be varied as desired. The stop ST disposed as described above adjusts an amount of light incident on an imaging plane 260.

The first lens 210 and the fifth lens 250 are symmetrical to each other in relation to the third lens. For example, both of the object-side surface S1 of the first lens 210 and the image-side surface S11 of the fifth lens 250 are concave, and both of the image-side surface S2 of the first lens 210 and the object-side surface S10 of the fifth lens 250 are convex.

Similarly, the second lens 220 and the fourth lens 240 are symmetrical to each other in relation to the third lens 230. For example, both of the object-side surface S3 of the second lens 220 and the image-side surface S9 of the fourth lens 240 are convex, and both of the image-side surface S4 of the second lens 220 and the object-side surface S8 of the fourth lens 240 are concave.

Figure 6:
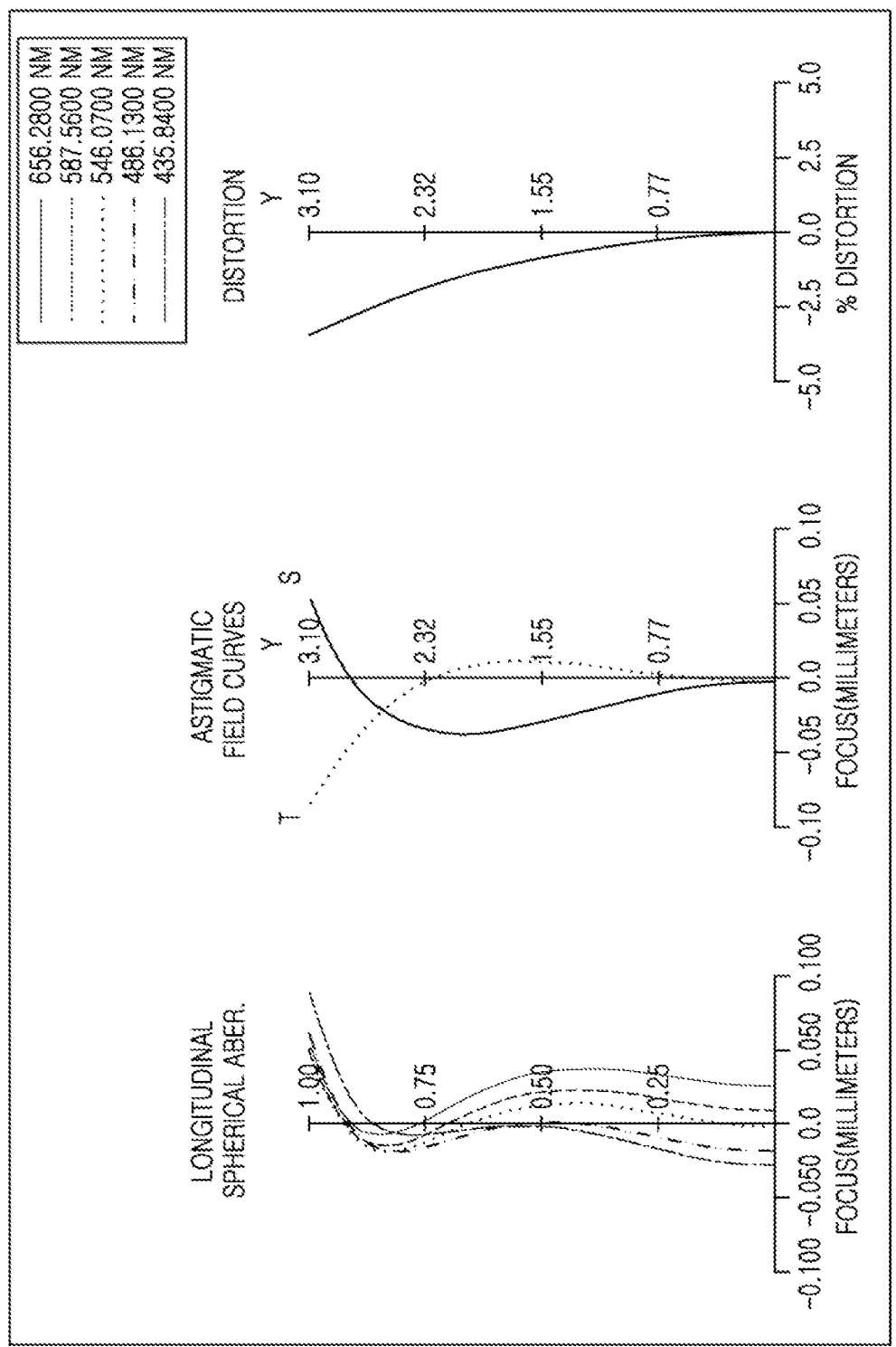
FIG. 6 is graphs representing aberration curves of the optical imaging system illustrated in FIG. 5.

The optical imaging system 200 configured as described above may represent has aberration characteristics as illustrated in FIG. 6. FIG. 7 is a table representing characteristics of lenses of the optical imaging system according to the second embodiment; and FIG. 8 is a table representing aspherical characteristics of the optical imaging system according to the second embodiment.

Table 1 represents optical characteristics of the optical imaging systems according to the first and second embodiments. An overall focal length (f) of the optical imaging system is in a range of 5.9 to 6.3. In the optical imaging system, a focal length (f1) of the first lens is in a range of 16.0 to 23.0. In the optical imaging system, a focal length (f2) of the second lens is in a range of 13.0 to 17.0. In the optical imaging system, a focal length (f3) of the third lens is in a range of −4.0 to −2.0. In the optical imaging system, a focal length (f4) of the fourth lens is in a range of 3.0 to 6.0. In the optical imaging system, a focal length (f5) of the fifth lens is in a range of 10.0 to 15.0. In the optical imaging system, TTL is in a range of 10.0 to 12.0. An F number of the optical imaging system is 1.7 or less. An overall field of view (2θ) of the optical imaging system is in a range of 54 to 57.

TABLE 1

| Remarks | First Embodiment | Second Embodiment |
| --- | --- | --- |
| f | 6.10000 | 6.10000 |
| f1 | 17.7092 | 21.0937 |
| f2 | 14.6895 | 14.8270 |
| f3 | −3.32328 | −3.35994 |
| f4 | 4.61078 | 4.77880 |
| f5 | 12.9971 | 12.0159 |
| TTL | 11.3754 | 11.3710 |
| F number | 1.67000 | 1.67000 |
| EDP | 3.65200 | 3.65200 |
| 2θ | 55.5000 | 55.5000 |
| Y | 3.10000 | 3.10000 |

Table 2 represents values of Conditional Expressions of the optical imaging systems according to the first and second embodiments. The optical imaging systems according to the first and second embodiments may satisfy all of numerical ranges of the above Conditional Expressions as seen in Table 2.

TABLE 2

| Remarks | First Embodiment | Second Embodiment |
|---|---|---|
| $\{(1/f) * (Y/\tan\theta) - 1\} * 100$ | −3.40769 | −3.40769 |
| TTL/2Y | 1.83474 | 1.83403 |
| R1/f | −14.9730 | −9.84410 |
| R2/f | −2.24721 | −2.08426 |
| f/f1 | 0.34445 | 0.28919 |
| f/f3 | −1.83554 | −1.81551 |
| f/EPD | 1.67032 | 1.67032 |
| (t1 + t2)/t3 | 5.00889 | 6.44000 |
| (R1 + R2)/(R1 − R2) | 1.35318 | 1.53719 |
| (R10 + R11)/(R10 − R11) | −3.01483 | −2.32345 |
| \|n1 − n2\| | 0.00700 | 0.14800 |

Since the optical imaging system configured as described above has the F number of 1.7 or less, it may clearly photograph an object in both of a visible ray region and a near infrared ray region as well as in a low illumination environment. In addition, since spherical lenses are used in the optical imaging system according to one or more embodiments, a cost required for manufacturing the optical imaging system may be reduced. In addition, the optical imaging system according to one or more embodiments may secure predetermined resolution in a temperature range of −40° C. to 80° C. Therefore, the optical imaging system according to one or more embodiments may achieve high resolution even in an environment in which a temperature change range is large, such as the interior of a vehicle.

As set forth above, the optical imaging systems according to one or more embodiments may clearly photograph an object even in a low illumination environment.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power;
   a second lens having a concave image-side surface in an optical axis region;
   a third lens having a concave object-side surface in an optical axis region and a concave image-side surface in an optical axis region;
   a fourth lens having a positive refractive power; and
   a fifth lens having a refractive power,
   wherein the first to fifth lenses are sequentially disposed in ascending numerical order along an optical axis from an object side of the optical imaging system toward an imaging plane of the optical imaging system,
   wherein a radius of curvature of an image-side surface of the fourth lens is greater than a radius of curvature of an object-side surface of the fourth lens,
   wherein a thickness along an optical axis of the first lens is greater than a thickness along an optical axis of the fifth lens, and
   wherein $5.0<(t1+t2)/t3<12.0$, where t1 is the thickness along the optical axis of the first lens, t2 is a thickness along the optical axis of the second lens, and t3 is a thickness along the optical axis of the third lens.

2. The optical imaging system of claim 1, wherein the first lens has a convex image-side surface in an optical axis region thereof.

3. The optical imaging system of claim 1, wherein the second lens has a convex object-side surface in an optical axis region thereof.

4. The optical imaging system of claim 1, wherein the fourth lens has a concave object-side surface in an optical axis region thereof.

5. The optical imaging system of claim 1, wherein the fourth lens has a convex image-side surface in an optical axis region thereof.

6. The optical imaging system of claim 1, wherein the fifth lens has a convex object-side surface in an optical axis region thereof.

7. The optical imaging system of claim 1, wherein the fifth lens has a concave image-side surface in an optical axis region thereof.

8. An optical imaging system comprising:
   a first lens having a positive refractive power;
   a second lens having a concave image-side surface in an optical axis region;
   a third lens having a concave object-side surface in an optical axis region;
   a fourth lens having a positive refractive power; and
   a fifth lens having a refractive power,
   wherein the first to fifth lenses are sequentially disposed in ascending numerical order along an optical axis from an object side of the optical imaging system toward an imaging plane of the optical imaging system,
   wherein a radius of curvature of an image-side surface of the first lens is greater than a radius of curvature of an object-side surface of the first lens and less than a radius of curvature of an object-side surface of the second lens,
   wherein a radius of curvature of an image-side surface of the fourth lens is greater than a radius of curvature of an object-side surface of the fourth lens,
   wherein a thickness along an optical axis of the first lens is greater than a thickness along an optical axis of the fifth lens, and
   wherein $5.0<(t1+t2)/t3<12.0$, where t1 is the thickness along the optical axis of the first lens, t2 is a thickness along the optical axis of the second lens, and t3 is a thickness along the optical axis of the third lens.

9. The optical imaging system of claim 8, wherein the second lens has a convex object-side surface in an optical axis region thereof.

10. The optical imaging system of claim 8, wherein the fourth lens has a concave object-side surface in an optical axis region thereof.

11. The optical imaging system of claim 8, wherein the fourth lens has a convex image-side surface in an optical axis region thereof.

12. The optical imaging system of claim 8, wherein the fifth lens has a concave image-side surface in an optical axis region thereof.

* * * * *